(12) United States Patent
Ananthapalli et al.

(10) Patent No.: US 11,157,204 B2
(45) Date of Patent: Oct. 26, 2021

(54) METHOD OF NVME OVER FABRIC RAID IMPLEMENTATION FOR READ COMMAND EXECUTION

(71) Applicant: SAMSUNG ELECTRONICS CO., LTD., Suwon-si (KR)

(72) Inventors: Sandeep Kumar Ananthapalli, Karnataka (IN); Venkataratnam Nimmagadda, Karnataka (IN); Shruthi Muthukumaran, Karnataka (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/441,507

(22) Filed: Jun. 14, 2019

(65) Prior Publication Data

US 2019/0384532 A1      Dec. 19, 2019

(30) Foreign Application Priority Data

Jun. 15, 2018   (IN) .............................. 201841022546

(51) Int. Cl.
  *G06F 3/06*      (2006.01)
(52) U.S. Cl.
  CPC .......... *G06F 3/0659* (2013.01); *G06F 3/0613* (2013.01); *G06F 3/0679* (2013.01); *G06F 3/0689* (2013.01)
(58) Field of Classification Search
  CPC .... G06F 3/0659; G06F 3/0613; G06F 3/0679; G06F 3/0689
  See application file for complete search history.

(56) References Cited

U.S. PATENT DOCUMENTS

| 8,565,269 | B2  | 10/2013 | Diab |
| 9,298,648 | B2  | 3/2016 | Johnson et al. |
| 9,384,093 | B1* | 7/2016 | Aiello .................. G06F 3/0688 |

(Continued)

OTHER PUBLICATIONS

Huang, Simon; "Introduction to NVMe Over Fabrics-V3R;" Oct. 30, 2016; Slideshare.net; available at: https://www.slideshare.net/SimonHuang16/introduction-to-nvme-over-fabricsv3r.*

(Continued)

*Primary Examiner* — Ryan Bertram
*Assistant Examiner* — Richard L Sutton
(74) *Attorney, Agent, or Firm* — Volentine, Whitt & Francos, PLLC

(57) ABSTRACT

A non-volatile memory express over fabrics (NVMeoF) redundant array of independent disks (RAID) controller includes an NVMeoF RAID target module, an NVMeoF RAID implementation module, and an NVMeoF RAID initiator module. The NVMeoF RAID target module receives one or more NVMeoF commands from one or more computer hosts. The NVMeoF RAID implementation module receives the one or more NVMeoF commands from the NVMeoF RAID target module and performs RAID functionalities on the one or more NVMeoF commands. The NVMeoF RAID initiator module receives the one or more NVMeoF commands from the NVMeoF RAID implementation module and transmits the one or more NVMeoF commands to the one or more storage target devices to establish one or more virtual queue pair connections and enable direct data transfer between the one or more computer hosts and the one or more storage target devices.

2 Claims, 5 Drawing Sheets

(56) References Cited

U.S. PATENT DOCUMENTS

| | | | |
|---|---|---|---|
| 10,346,041 B2* | 7/2019 | Olarig | G06F 11/3006 |
| 2017/0286363 A1* | 10/2017 | Joshua | H04L 69/08 |
| 2018/0239539 A1* | 8/2018 | He | G06F 3/0659 |
| 2019/0101880 A1* | 4/2019 | Guim Bernat | G06F 12/0813 |
| 2019/0227744 A1* | 7/2019 | Olarig | G06F 3/0619 |
| 2019/0255772 A1* | 8/2019 | Mizukami | B29C 64/106 |
| 2020/0293465 A1* | 9/2020 | Yang | G06F 3/0635 |

OTHER PUBLICATIONS

By cfheoh; "The rise of RDMA;" May 8, 2017; Storage Gaga; available at: http://storagegaga.com/the-rise-of-rdma/.*

LF Events; "NVMe Over Fabrics Support in Linux;" Aug. 12, 2016; Slideshare.net; available at: https://www.slideshare.net/lfevents/nvme-over-fabrics-support-in-linux.*

"NVM Express over Fabrics Revision 1.0;" Jun. 5, 2016; NVMExpress.org; available at: https://nvmexpress.org/wp-content/uploads/NVMe_over_Fabrics_1_0_Gold_20160605-1.pdf.*

Davis, Rob; "NVMe Over Fabrics Powered by RoCE;" Oct. 24, 2017; Mellanox Technologies; available at: https://blog.mellanox.com/author/robdavis/.*

Huang, Simon; "Introduction to NVMe Over Fabrics-V3R and transcripts;" Oct. 30, 2016; Slideshare.net; available at: https://www.slideshare.net/SimonHuang16/introduction-to-nvme-over-fabricsv3r (Year: 2016).*

By cfheoh; "The rise of RDMA;" May 8, 2017; Storage Gaga; available at: http://storagegaga.com/the-rise-of-rdma/ (Year: 2017).*

ZCopy; "Quick Concepts Part 1—Introduction to RDMA;" Oct. 8, 2010; available at: https://zcopy.wordpress.com/tag/queue-pairs/ (Year: 2010).*

Deming, David; "InfiniBand Software Architecture and RDMA;" 2013; available at: https://www.snia.org/sites/default/files/files2/files2/SDC2013/presentations/Hardware/DavidDeming_IBA_Software_RDMA.pdf (Year: 2013).*

Mellanox Technologies; "The Case for InfiniBand over Ethernet;" Apr. 2008; available at: https://www.mellanox.com/pdf/whitepapers/WP_The_Case_for_InfiniBand_over_Ethernet.pdf (Year: 2008).*

Kim, John et. al.; "How Ethernet RDMA Protocols iWARP and RoCE Support NVMe over Fabrics." Jan. 26, 2016; available at: https://www.snia.org/sites/default/files/ESF/How_Ethernet_RDMA_Protocols_Support_NVMe_over_Fabrics_Final.pdf (Year: 2016).*

"NVM Express over Fabrics Revision 1.0;" Jun. 5, 2016; NVMExpress.org; available at: https://nvmexpress.org/wp-content/uploads/NVMe_over_Fabrics_1_0_Gold_20160605-1.pdf (Year: 2016).*

* cited by examiner

METHOD OF NVME OVER FABRIC RAID IMPLEMENTATION FOR READ COMMAND EXECUTION

CROSS-REFERENCE TO RELATED APPLICATIONS

This application claims priority under 35 U.S.C. § 119 to Indian Patent Application No. 201841022546 filed on Jun. 15, 2018, in the Indian Intellectual Property Office, the disclosure of which is incorporated herein by reference in its entirety.

TECHNICAL FIELD

The present disclosure generally relates to storage systems, and more particularly, the present disclosure relates to a system and method for efficient redundant array of independent disks (RAID) implementation of read command execution through virtual connected queue-pairs in non-volatile memory express over fabrics (NVMeoF) ethernet based solid-state drives (SSDs).

DISCUSSION OF RELATED ART

Redundant array of independent disks (RAID) is a storage technology that combines multiple disk drive components into a logical unit. Data is distributed across the drives in one of several ways called "RAID levels", depending on the level of redundancy and performance. A solid-state drive (SSD), or solid-state disk is a solid-state storage device that uses integrated circuit assemblies as memory to store data persistently. SSD technology primarily uses electronic interfaces compatible with traditional block input/output (I/O) hard disk drives (HDDs), which permit simple replacements in common applications.

An existing storage system is typically a physical server (storage box node) with one or more hard-disk drives (HDDs) or one or more solid-state drives (SSDs). The existing storage system can also be a virtual machine or virtual logical unit member with access to one or more HDDs and/or SSDs. The existing storage system can have Peripheral Component Interconnect Express (PCIe) scaling limitations. The existing storage system is bulky as it requires a central processing unit (CPU), a complex motherboard with the RAID hardware which is expensive as shown in FIG. 1. Further the existing storage system performs data transfer with more than one direct memory access (DMA) data copies. These more than one DMA data transactions results in more latency and consumption of more power.

FIG. 1 is a schematic diagram illustrating an existing architecture with a storage box node 106 for data transfer, according to a related art. According to the related art, one or more computer hosts 102_1 to 102_M are connected to 40G/100G ethernet switch 104 which in turn is connected to the storage box node 106. The storage box node 106 includes one or more SSDs 108_1 to 108_N with RAID hardware and has PCIe scaling limitations. The storage box node 106 also includes a CPU, mother board with the RAID hardware which is expensive and makes the storage box node 106 bulky. Also, the data transfer between the storage box node 106 and the one or more computer hosts 102_1 to 102_M is performed with multiple data transactions which creates data traffic, consumes power and increases latency.

Therefore, there is a need for a system and method that addresses the herein above-mentioned issues and problems and provide solutions. Accordingly, there remains a need for a system to solve the problem of scalability (Ethernet SSDs can scale way beyond PCIe), power and latency but also opens up a possibility of direct data transfer between the storage nodes and computer hosts.

SUMMARY

Various embodiments herein describe an NVMeoF redundant array of independent disks (RAID) controller for performing a direct data transfer between a computer host and one or more storage target devices over fabrics. The NVMeoF redundant array of independent disks (RAID) controller includes an NVMeoF RAID target module, an NVMeoF RAID implementation module and an NVMeoF RAID initiator module. The NVMeoF RAID target module is adapted for interacting with the computer host and receiving one or more non-volatile memory express over fabrics (NVMeoF) commands from the computer host. The NVMeoF RAID implementation module is adapted for receiving the one or more NVMeoF commands from the NVMeoF RAID target module and performing RAID functionalities on the one or more received NVMeoF commands. The NVMeoF RAID initiator module is adapted for interacting with the one or more storage target devices. The NVMeoF RAID initiator module receives the one or more NVMeoF commands from the NVMeoF RAID implementation module, transmits the one or more NVMeoF commands to the one or more storage target devices, and establishes one or more virtual queue pair connections between the computer host and the one or more storage target devices to enable the direct data transfer between the computer host and the one or more storage target devices.

In another embodiment, a method of establishing computer-end physical connections between a computer host and an NVMeoF RAID target module includes: (1) issuing, by the computer host, one or more NVMeoF connect commands to the NVMeoF RAID target module for establishing the computer-end physical connection, (2) receiving, by the NVMeoF RAID target module, the issued one or more NVMeoF connect commands from the computer host, to create an admin and input/output (I/O) queues within the NVMeoF RAID target module, (3) transmitting, by the NVMeoF RAID target module, one or more NVMeoF connect command completions to the computer host, and (4) receiving, by the computer host, the one or more NVMeoF connect command completions from the NVMeoF RAID target module when the computer-end physical connection is established.

In another embodiment, a method of establishing one or more storage-end physical connections between an NVMeoF RAID initiator module and one or more storage target devices includes: (1) issuing, by the NVMeoF RAID initiator module, one or more NVMeoF connect commands to the one or more storage target devices for establishing the one or more storage-end physical connections, (2) receiving, by the one or more storage target devices, the one or more NVMeoF connect commands from the NVMeoF RAID initiator module to create and enable one or more I/O queues within the one or more storage target devices, (3) transmitting, by the one or more storage target devices, one or more NVMeoF connect command completions to the NVMeoF RAID initiator module, and (4) receiving, by the NVMeoF RAID initiator module, one or more NVMeoF connect command completions from the one or more storage target devices, when the one or more storage-end physical connections are established.

In another embodiment, a method of establishing one or more virtual queue pair connections for enabling a direct data transfer between one or more computer hosts and one or more storage target devices includes: (1) issuing, by an NVMeoF RAID initiator module, one or more vendor connect commands to the one or more storage target devices, wherein the one or more vendor connect commands comprise information about the one or more computer hosts for establishing the one or more virtual queue pair connections between one or more computer hosts and the one or more storage target devices, (2) receiving, by the one or more storage target devices, the one or more vendor connect commands to create a virtual admin and enable I/O queue connections between the one or more computer hosts and the one or more storage target devices, (3) transmitting, by the one or more storage target devices, one or more vendor connect command completions to the NVMeoF RAID initiator module when the one or more virtual queue pair connections are established, and (4) receiving, by the NVMeoF RAID initiator module, the one or more vendor connect command completions from the one or more storage target devices.

In another embodiment, a method for reading input/output (I/O) data between a computer host and one or more storage target devices includes: (1) sending, by the computer host, one or more NVMeoF READ commands to an NVMeoF RAID target module for reading data in the one or more storage target devices for n logical blocks (nLB) starting from a start logical block address (sLBA), (2) identifying, by an NVMeoF RAID implementation module, the one or more storage target devices on which the data from the nLB are stored, (3) initiating, by an NVMeoF RAID initiator module, one or more NVMeoF Read commands to the one or more storage target devices identified that are comprising the data from the respective sLBA and nLB, (4) initiating, by the one or more storage target devices, RDMA_WRITE transactions directly to the computer host by using one or more virtual queue-pair connections, (5) transmitting, by one or more storage target devices, one or more successful read completions to the NVMeoF RAID initiator module, and (6) transmitting, by the NVMeoF RAID target module, successful read command completions from the one or more storage target devices as a consolidate single command completion to the computer host.

In another embodiment, a method for performing an input/output (I/O) READ fault tolerance data between a computer host and one or more storage target devices includes: (1) transmitting, by the computer host, one or more NVMeoF READ commands to an NVMeoF RAID target module for reading data in the one or more storage target devices for nLB starting from sLBA, (2) identifying, by an NVMeoF RAID controller, the one or more storage target devices on which the data from the nLB starting from the sLBA are stored, (3) initiating, by an NVMeoF RAID initiator module, the one or more NVMeoF Read commands over one or more storage-end physical connections to the identified one or more registered storage target devices that are comprising the data from the respective sLBA and nLB, (4) initiating, by the one or more storage target devices, one or more RDMA_WRITE transactions directly to the computer host by using one or more virtual queue-pair connections, (5) transmitting, by one or more storage target devices, one or more read command completions to the NVMeoF RAID initiator module using the one or more storage-end physical connections, (6) obtaining, by the NVMeoF RAID initiator module, a read completion failure over the one or more storage-end physical connections, (7) identifying the cause to reconstruct the data for the read completion failure, (8) re-issuing, by the NVMeoF RAID initiator module, one or more NVMeoF READ commands to the one or more registered storage target devices over the one or more storage-end physical connections, (9) transmitting, by the one or more storage target devices, respective stripes and parity to the NVMeoF RAID initiator module through the one or more RDMA_WRITE transactions over the one or more storage-end physical connections, (10) retrieving, by the NVMeoF RAID controller, missing stripes from the received stripes and the parity stripe, (11) transmitting, by the one or more storage target devices, one or more successful NVMeoF read completions to the NVMeoF RAID initiator module, (12) transmitting, by the NVMeoF RAID target module, the retrieved stripes as RDMA_WRITE to the computer host, and (13) sending, by the NVMeoF RAID target module of the NVMeoF RAID controller, a consolidated NVMeoF command completion to the computer host.

According to another embodiment, a method of providing remote direct memory access (RDMA) between a host computer and a non-volatile memory express over fabrics (NVMeoF) storage device through an Ethernet system includes: (1) providing a first physical connection between the host computer and an RDMA controller through the Ethernet system; (2) providing a second physical connection between the RDMA controller and the NVMeoF storage device through the Ethernet system; (3) providing a first virtual queue-pair connection between the host computer and the NVMeoF storage device; and (4) communicating first data of a direct memory access (DMA) from the NVMeoF storage device to the host computer through the first virtual queue-pair connection using the first physical connection and the second physical connection.

According to another embodiment, a remote direct memory access (RDMA) controller that provides RDMA between a host computer and a non-volatile memory express over fabrics (NVMeoF) storage device through an Ethernet system includes a host interface and a storage interface. The host interface provides a first physical connection with the host computer through the Ethernet system. The storage interface: (1) provides a second physical connection with the NVMeoF storage device through the Ethernet system, and (2) provides a first virtual queue-pair connection between the host computer and the NVMeoF storage device that communicates first data of a direct memory access (DMA) from the NVMeoF storage device to the host computer through the first virtual queue-pair connection using the first physical connection and the second physical connection.

The foregoing has outlined, in general, the various aspects of the disclosure and is to serve as an aid to better understand the more complete detailed description which is to follow. In reference to such, there is to be a clear understanding that the present disclosure is not limited to the method or application of use described and illustrated herein. It is intended that any other advantages and objects of the present disclosure that become apparent or obvious from the detailed description or illustrations contained herein are within the scope of the present disclosure.

BRIEF DESCRIPTION OF THE ACCOMPANYING DRAWINGS

Other objects, features and advantages will occur to those skilled in the art from the following description of the preferred embodiment and the accompanying drawings in which.

Although specific features of the present disclosure are shown in some drawings and not in others, this is done for convenience only as each feature may be combined with any or all of the other features in accordance with the present disclosure.

DETAILED DESCRIPTION OF THE ACCOMPANYING DRAWINGS

The present disclosure describes a system and method for efficient RAID implementation of read command execution through virtual connected queue-pairs in ethernet based storage target devices. In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following detailed description is, therefore, not to be taken in a limiting sense, and the scope of the present disclosure is defined only by the appended claims.

Figure 1:
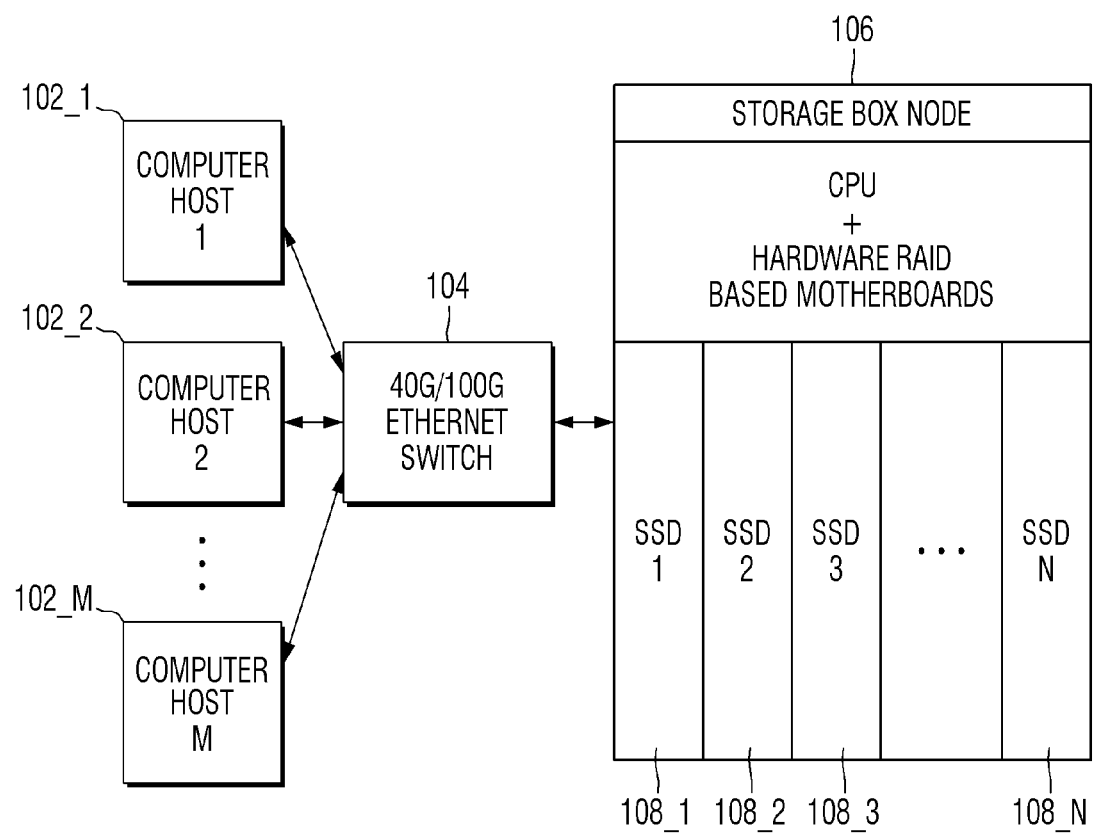
FIG. 1 is a schematic diagram illustrating a related art architecture with a storage box node for data transfer.
Figure 2:
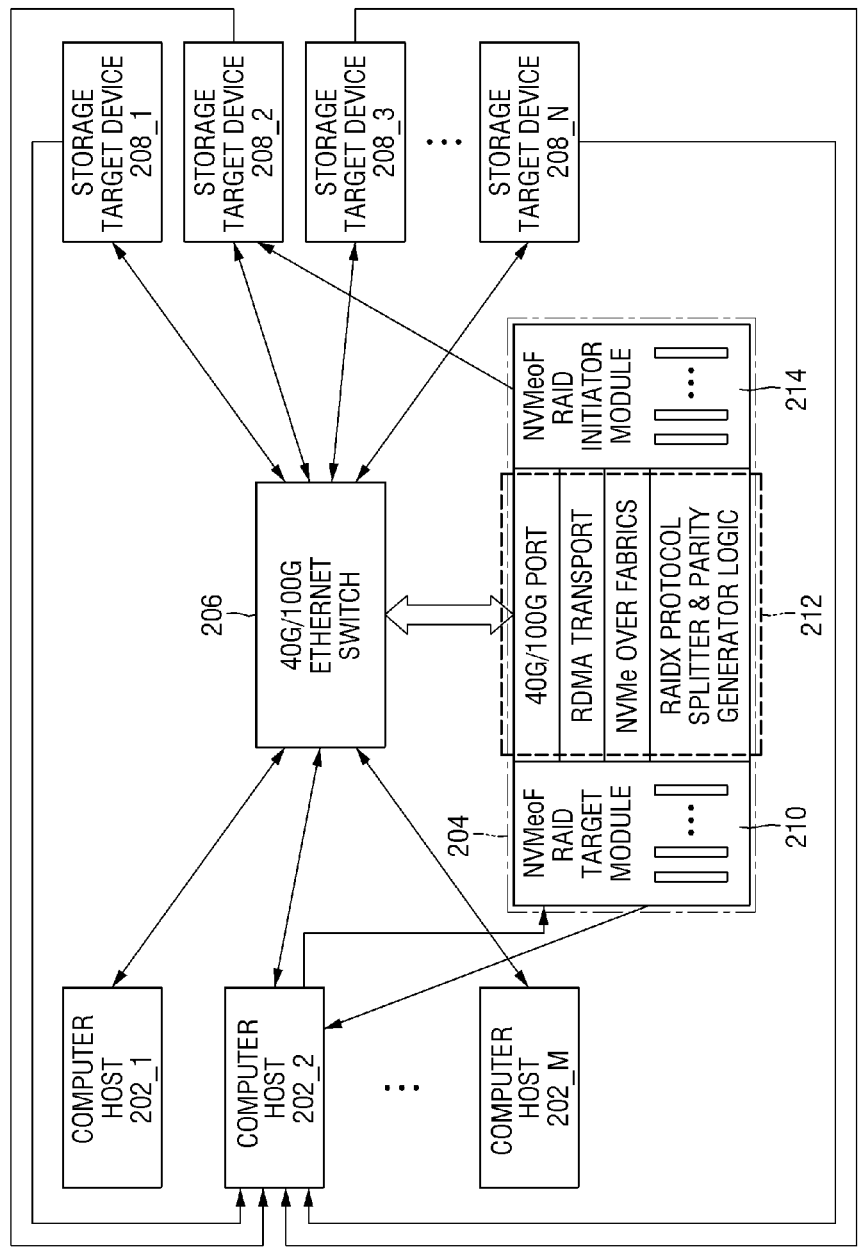
FIG. 2 is a schematic diagram illustrating an exemplary method for efficient RAID implementation through virtual connected queue-pairs in storage target devices, according to an embodiment of the present disclosure.

FIG. 2 is a schematic diagram illustrating an exemplary method for efficient redundant array of independent disks (RAID) implementation through virtual connected queue-pairs in storage target devices 208_1 to 208_N, according to an embodiment of the present disclosure. According to this embodiment, data transfer between one or more computer hosts 202_1 to 202_M and one or more storage target devices 208_1 to 208_N is performed directly utilizing the virtual connected queue pairs created by a non-volatile memory express over fabrics (NVMeoF) RAID controller 204. The NVMeoF RAID controller 204, the one or more computer hosts 202_1 to 202_M and the one or more storage target devices 208_1 to 208_N are connected to an ethernet switch 206. The NVMeoF RAID controller 204 includes an NVMeoF RAID target module 210, an NVMeoF RAID implementation module 212 and an NVMeoF RAID initiator module 214. The NVMeoF RAID implementation module 212 may comprise a 40G/100G PORT, RDMA TRANSPORT, a NVMe OVER FABRICS and/or a RAIDX PROTOCOL SPLITTER & PARITY GENERATOR LOGIC but not limited to this component. The NVMeoF RAID target module 210 is adapted to interact with the one or more computer hosts 202_1 to 202_M and receive one or more NVMeoF commands from the one or more computer hosts 202_1 to 202_M. The NVMeoF RAID implementation module 212 is adapted to receive the one or more NVMeoF commands from the NVMeoF RAID target module 210 and perform RAID functionalities on the one or more received NVMeoF commands.

The NVMeoF RAID initiator module 214 receives the one or more NVMeoF commands from the NVMeoF RAID implementation module 212 and transmits the one or more NVMeoF commands to the one or more storage target devices 208_1 to 208_N. The NVMeoF RAID initiator module 214 establishes one or more virtual queue pair connections between the one or more computer hosts 202_1 to 202_M and the one or more storage target devices 208_1 to 208_N to enable the direct data transfer between the one or more computer hosts 202_1 to 202_M and the one or more storage target devices 208_1 to 208_N. The direct data transfer between the one or more computer hosts 202_1 to 202_M and the one or more storage target devices 208_1 to 208_N is achieved through one or more computer-end physical connections established between the one or more computer hosts 202_1 to 202_M and the NVMeoF RAID target module 210, one or more storage-end physical connections established between the NVMeoF RAID initiator module 214 and the one or more storage target devices 208_1 to 208_N and one or more virtual queue pair connections between the one or more computer hosts 202_1 to 202_M and the one or more storage target devices 208_1 to 208_N.

Figure 3:
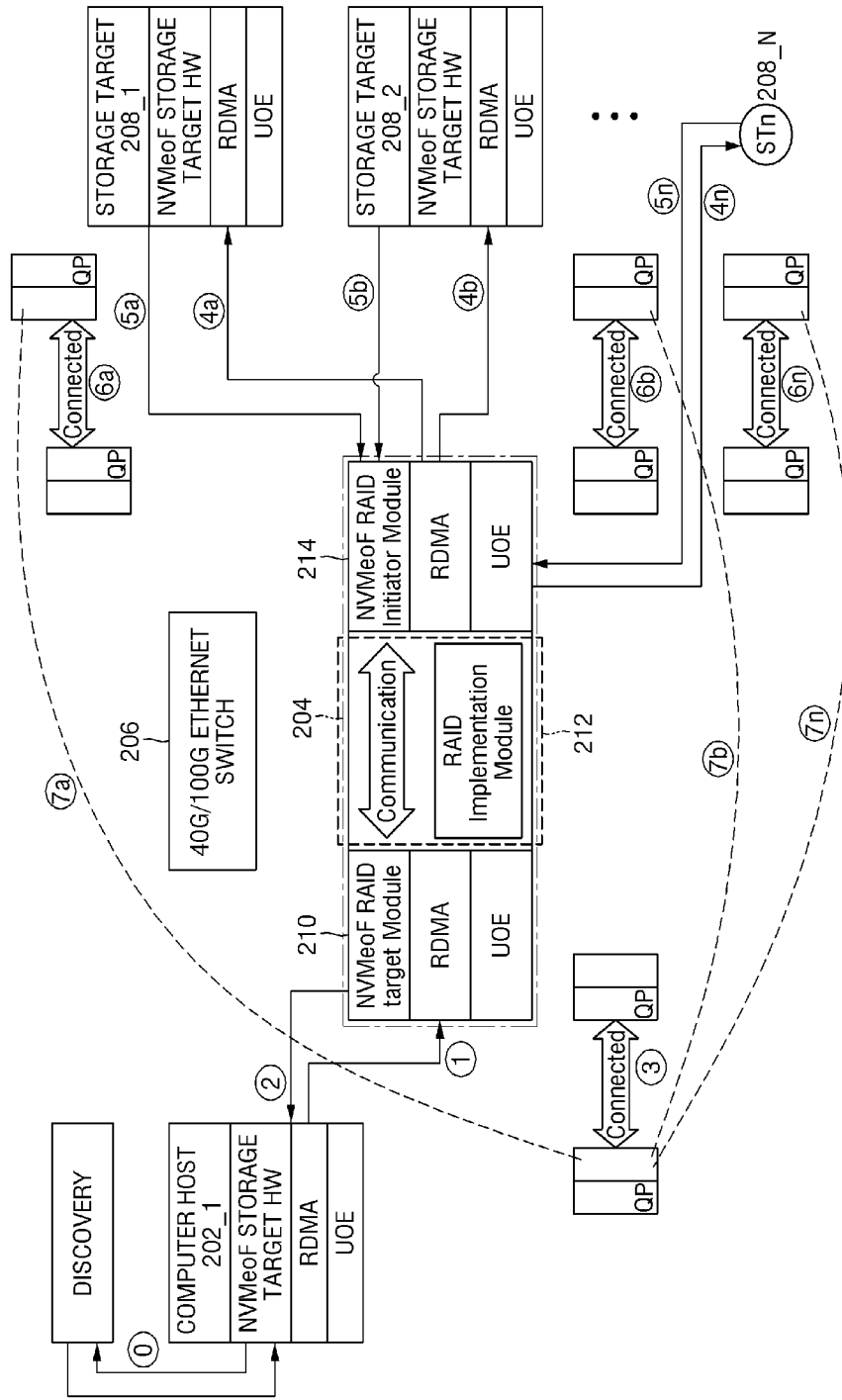
FIG. 3 is a schematic flow diagram illustrating a method of establishing one or more virtual queue pair connections between a computer host and one or more storage target devices utilizing an NVMeoF RAID controller, according to an embodiment of the present disclosure.

FIG. 3 is a schematic flow diagram illustrating a method of establishing one or more virtual queue pair connections between a computer host 202_1 and one or more storage target devices 208_1 to 208_N utilizing an NVMeoF RAID controller 204, according to an embodiment of the present disclosure. According to this figure, at step 0, the computer host 202_1 performs discovery and finds the NVMeoF RAID controller 204. The computer host 202_1 may comprise a NVMeoF STORAGE TARGET HW and/or a RDMA and/or an UOE (UDP Offload Engine). At step 1, the computer host 202_1 sends an NVMeoF connect command to the NVMeoF RAID controller 204. At step 2, an NVMeoF RAID target module 210 sends an NVMeoF connect command's completion to the computer host 202_1. The NVMeoF RAID target module 210 may comprise a RDMA and/or an UOE. At step 3, the computer host 202_1 establishes computer-end physical connection with the NVMeoF RAID controller 204. NVMeoF RAID implementation module 212 provides the registered storage targets' information to NVMeoF RAID initiator module 214. The NVMeoF RAID Initiator Module 214 may comprise a RDMA and/or an UOE. At step 4, 4a-4n, the NVMeoF RAID initiator module 214 sends (a) one or more NVMeoF connect commands with transport context information of the NVMeoF RAID initiator module 214 and (b) one or more vendor connect commands with transport context information of the computer host 202_1 to the one or more storage target devices 208_1 to 208_N that are registered to establish one or more storage-end physical connections. The one or more storage target devices 208_1 to 208_N may comprise a NVMeoF STORAGE TARGET HW and/or a RDMA and/or an UOE. In an embodiment, each vendor connect command of the one or more vendor connect commands, transmitted by the NVMeoF RAID initiator module 214 to the one or more storage target devices 208_1 to 208_N that are registered, are distinct/unique commands with respect to each other.

At step 5, 5a-5n, one or more storage targets devices 208_1 to 208_N send NVMeoF connect command completion and vendor connect command completion to the NVMeoF RAID initiator module 214 after internally storing the transport context information of NVMeoF RAID initiator module 214 and computer host 202_1. At step 6, 6a-6n the NVMeoF RAID initiator module 214 establishes the one or more storage-end physical connections with one or more storage target devices 208_1 to 208_N that are registered. At step 7, 7a-7n, the one or more storage target devices 208_1 to 208_N establish one or more virtual queue pair (QP) connections with the computer host 202_1. The one or more virtual queue-pair connections allow direct data transfer between the one or more storage target devices 208_1 to 208_N and the computer host 202_1. In an embodiment, the one or more virtual queue-pair connections are established between one or more computer hosts 202_1 to 202_M and the one or more storage target devices 208_1 to 208_N. The one or more virtual queue pair connections are established through one or more computer-end physical connections, one or more storage-end physical connections and by storing the transport context information of computer host 202_1 to 202_M and NVMeoF RAID initiator module 214 in the one or more storage target devices 208_1 to 208_N.

Figure 4:
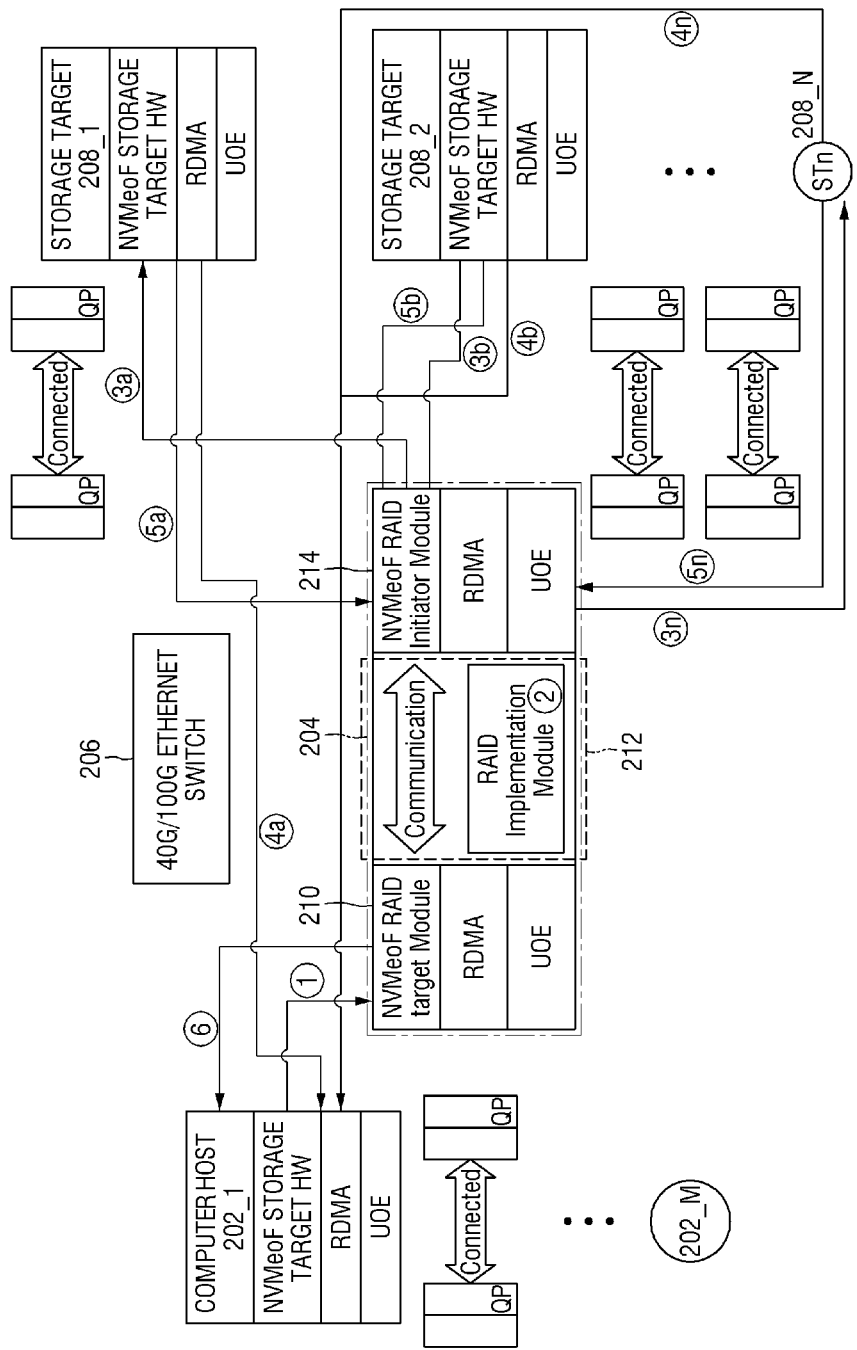
FIG. 4 is a schematic flow diagram illustrating reading an input/output (I/O) data flow between a computer host and one or more storage target devices, according to an embodiment of the present disclosure.

FIG. 4 is a schematic flow diagram illustrating reading input/output (I/O) data between a computer host 202_1 and one or more storage target devices 208_1 to 208_N, according to an embodiment of the present disclosure. According to this figure, at step 1, the computer host 202_1 sends an NVMeoF read command to an NVMeoF RAID target module 210 on a computer-end physical connection for reading data for n logical blocks (nLB) starting from a start logical block address (sLBA). The computer host 202_1 may comprise a NVMeoF STORAGE TARGET HW and/or a RDMA and/or an UOE. The NVMeoF RAID target Module 210 may comprise a RDMA and/or an UOE. At step 2, an NVMeoF RAID implementation module 212 identifies the one or more storage target devices 208_1 to 208_N on which the data from the nLB are stored. The one or more storage target devices 208_1 to 208_N may comprise a NVMeoF STORAGE TARGET HW and/or a RDMA and/or an UOE. At step 3, 3a-3n, an NVMeoF RAID initiator module 214 initiates transmission of the one or more NVMeoF Read commands on one or more storage-end physical connections to the one or more storage target devices 208_1 to 208_N (e.g. the one or more storage target devices that are registered) identified as storing the data from the respective sLBA and nLB. The NVMeoF RAID Initiator Module 214 may comprise a RDMA and/or an UOE. At step 4, 4a-4n, the one or more storage target devices 208_1 to 208_N initiate remote direct memory access (RDMA) write (RDMA_WRITE) transactions directly to the computer host 202_1 by using one or more established virtual queue pair connections. At step 5, 5a-5n, the one or more storage target devices 208_1 to 208_N transmit one or more successful read completions to the NVMeoF RAID initiator module 214 on the one or more storage-end physical connections. Finally, at step 6, the NVMeoF RAID target module 210 transmits a consolidate single command completion to the computer host 202_1 on the computer-end physical connection. In an embodiment, one or more NVMeoF read commands are executed between one or more computer hosts 202_1 to 202_M and the one or more storage target devices 208_1 to 208_N utilizing the NVMeoF RAID controller 204 via the above-mentioned steps.

Figure 5:
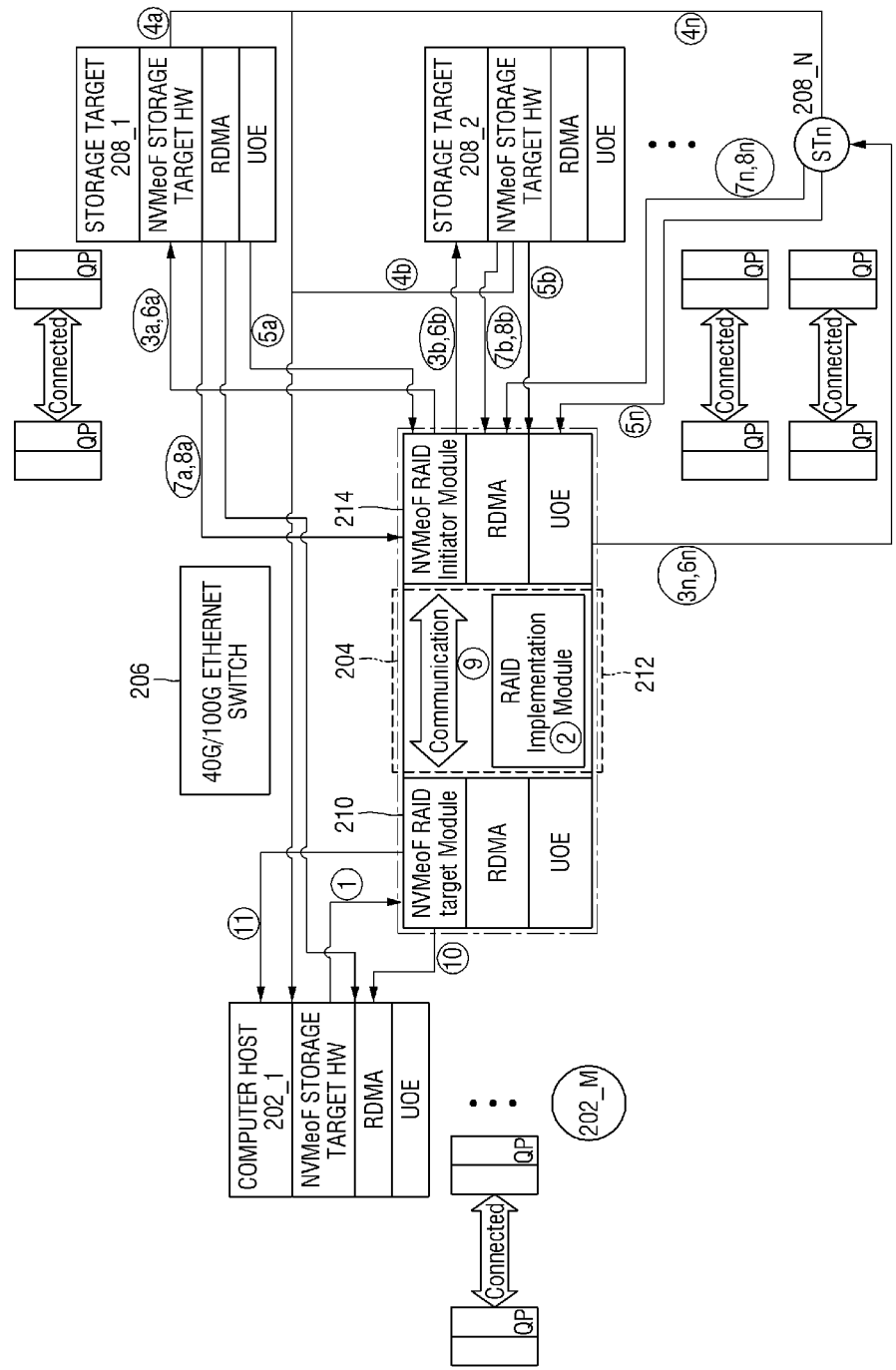
FIG. 5 is a schematic flow diagram illustrating communication of input/output (I/O) READ fault tolerance data between a computer host and one or more storage target devices, according to an embodiment of the present disclosure.

FIG. 5 is a schematic flow diagram illustrating communication of input/output (I/O) NVMeoF READ fault tolerance data between a computer host 202_1 and an NVMeoF RAID controller 204, according to an embodiment of the present disclosure. At step 1, the computer host 202_1 sends an NVMeoF READ command to an NVMeoF RAID target module 210 to read data for n logical blocks (nLB) from a start logical block address (sLBA). The computer host 202_1 may comprise a NVMeoF STORAGE TARGET HW and/or a RDMA and/or an UOE. The NVMeoF RAID target Module 210 may comprise a RDMA and/or an UOE. At step 2, an NVMeoF RAID implementation module 212 identifies one or more storage target devices 208_1 to 208_N on which the data of the nLB are stored. At step 3, 3a-3n, an NVMeoF RAID initiator module 214 initiates transmission of one or more NVMeoF read commands on one or more storage-end physical connections to the one or more storage target devices 208_1 to 208_N identified as storing the data from the respective sLBA and nLB. The one or more storage target devices 208_1 to 208_N may comprise a NVMeoF STORAGE TARGET HW and/or a RDMA and/or an UOE. The NVMeoF RAID Initiator Module 214 may comprise a RDMA and/or an UOE.

At step 4, 4a-4n, the one or more storage target devices 208_1 to 208_N initiate one or more RDMA_WRITE transactions directly to the computer host 202_1 by using one or more virtual queue-pair connections for the corresponding logical blocks' data transfer. At step 5, 5a-5n, the one or more storage target devices 208_1 to 208_N further transmit one or more read command completions to the NVMeoF RAID initiator module 214 on one or more storage-end physical connections. The NVMeoF RAID initiator module 214 obtains a read completion failure command over one of the one or more storage-end physical connections and identifies the cause to reconstruct the data for the read completion failure.

At step 6, 6a-6n, the NVMeoF RAID initiator module 214 reissues the one or more NVMeoF READ commands to the one or more storage target devices 208_1 to 208_N (which sent successful completions earlier) that are registered. The one or more NVMeoF READ commands are reissued to request the one or more storage target devices 208_1 to 208_N to send data to NVMeoF RAID initiator module 214 over the one or more storage-end physical connections. At step 7, 7a-7n, the one or more storage target devices 208_1 to 208_N initiate one or more RDMA_WRITE transactions to the NVMeoF RAID initiator module 214 through the one or more storage-end physical connections for the corresponding logical blocks' data transfer. At step 8, 8a-8n, the one or more storage target devices 208_1 to 208_N transmit one or more successful NVMeoF read completions to the NVMeoF RAID initiator module 214. At step 9, the NVMeoF RAID controller 204 retrieves a missing stripe (the data corresponding to the failure completion received earlier by the NVMeoF RAID initiator module 214) from the received stripes and a parity stripe. At step 10, the NVMeoF RAID target module 210 transmits the retrieved stripe as RDMA_WRITE transactions to the computer host 202_1. Finally, at step 11, the NVMeoF RAID target module 210 of the NVMeoF RAID controller 204 sends a consolidated NVMeoF command completion to the computer host 202_1. In an embodiment, one or more NVMeoF read commands' fault tolerance are handled between one or more computer hosts 202_1 to 202_M and the NVMeoF RAID controller 204 via the above-mentioned steps.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

While the specification has been described in detail with respect to specific embodiments of the disclosure, it will be appreciated that those skilled in the art, upon attaining an understanding of the foregoing, may readily conceive of alterations to, variations of, and equivalents to these embodiments. These and other modifications and variations to the present disclosure may be practiced by those of ordinary skill in the art, without departing from the scope of the present disclosure. Furthermore, those of ordinary skill in the art will appreciate that the foregoing description is by way of example only and is not intended to limit the disclosure. Thus, it is intended that the present subject matter covers such modifications and variations.

We claim:

1. A method of establishing a connection between a computer host and a first storage device via an intermediate device, the method comprising:
    issuing, by the computer host, a first non-volatile memory express over fabrics (NVMeoF) connect command to the intermediate device to establish a computer-end physical connection between the intermediate device and the computer host;
    creating by the intermediate device, in response to receiving the first NVMeoF connect command from the computer host, first input/output (I/O) queues within the intermediate device;
    transmitting, by the intermediate device, a first NVMeoF connect command completion to the computer host;
    receiving, by the computer host, the first NVMeoF connect command completion from the intermediate device;
    issuing, by the intermediate device, a second NVMeoF connect command to the first storage device for establishing a first storage-end physical connection between the first storage device and the intermediate device;
    creating by the first storage device, in response to receiving the second NVMeoF connect command from the intermediate device, a second input/output (I/O) queue within the storage device;
    transmitting, by the first storage device, a second NVMeoF connect command completion to the intermediate device;
    receiving, by the intermediate device, the second NVMeoF connect command completion from the first storage device; and
    communicating first data of a direct memory access (DMA) from the first storage device to the computer host through the first input/output (I/O) queues and the second input/output (I/O) queue using the computer-end physical connection and the first storage-end physical connection.

2. The method of claim 1, further comprising:
    issuing, by the intermediate device, a third NVMeoF connect command to a second storage device for establishing a second storage-end physical connection between the second storage device and the intermediate device;
    creating by the second storage device, in response to receiving the third NVMeoF connect command from the intermediate device, a third input/output (I/O) queue within the second storage device;
    transmitting, by the second storage device, a third NVMeoF connect command completion to the intermediate device;
    receiving, by the intermediate device, the third NVMeoF connect command completion from the second storage device; and
    communicating the first data of the direct memory access (DMA) from the first and second storage devices to the computer host through the first input/output (I/O) queues, the second input/output (I/O) queue and the third input/output (I/O) queue using the computer-end physical connection and the first and second storage-end physical connections.

* * * * *